Patented Feb. 9, 1937

2,070,163

UNITED STATES PATENT OFFICE 2,070,163

3:6-DIAMINO-10-METHYL-ACRIDINIUM METHANE-SULPHONATE

Paul Louis Gailliot, St. Maur-des-Fosses, France, assignor to Societe des Usines Chimiques Rhone-Poulenc, Paris, France No Drawing. Application August 15, 1935, Serial No. 36,328. In Great Britain August 23, 1934

1 Claim. (Cl. 260—36)

This invention relates to the production of a new easy soluble salt of 3:6-diamino-10-methyl acridinium.

The use of 3:6-diamino-10-methyl acridinium chloride in medicine has long been known, but has been limited in practice by the very low solubility of the pure product in water at ordinary temperatures, this solubility being, at most, 0.3 per cent at 20° C., (vide Quarterly Journal of Pharmacy and Pharmacology, Vol. VII, pages 63–75).

Until now this difficulty has been overcome by utilizing the property possessed by 3:6-diaminoacridine hydrochloride (a product which itself has a maximum solubility of about 0.3 per cent at 20° C.) of increasing considerably the solubility of 3:6-diamino-10-methyl-acridinium chloride (see British patent specifications Nos. 328,212 and 345,631), but the solutions thus obtained are not stable at ordinary temperatures unless their total content of solid product is less than 3 per cent, which is still insufficient for many purposes. By heating to 50° C. it is possible to obtain solutions up to 15 to 20 per cent in strength, but the purer the constituents employed in the mixture the less stable are these solutions at 20° C. (vide Quarterly Journal of Pharmacy and Pharmacology, Vol. VII, pages 63–75).

Lastly, it is known that 3:6-diamino-10-methyl-acridinium chloride is definitely more active against certain micro-organisms than 3:6-diamino-acridine hydrochloride.

There is, therefore, an obvious advantage in eliminating the latter from therapeutic preparations.

Now I have found that the acetate, the lactate, the methane-sulphonate and other organic salts of 3:6-diamino-10-methyl-acridinium are much more soluble than the chloride, but, whilst the first two are amorphous in the solid state, the methane sulphonate can be easily obtained in a crystalline form, thus presenting a definite guarantee of purity, and responding to the formula:

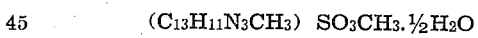
$(C_{13}H_{11}N_3CH_3)\ SO_3CH_3.\tfrac{1}{2}H_2O$

An analytical example is as follows:—
Found:—S:9.98%: N: 12.88% (CH3): 4.56%
Calculated from the above
formula:—S:9.78%: N:12.84% (CH3):4.58%

This salt is rapidly soluble to the extent of one part in two parts of water at 20° C. Its aqueous solutions are neutral to litmus and to Congo red, both in 25 per cent concentration and in very great dilutions. This indicates absence of hydrolysis. Moreover, the solutions can be sterilized and preserved for an indefinite period, provided they are protected from light. Also they can be heated for several days at 80° C. in sealed ampoules without any alteration, whereas the mixtures containing 3:6-diamino-acridine hydrochloride are decomposed under these conditions, and deposit brown or black amorphous sediments.

According to the present invention therefore, I produce an easily soluble well crystallizable salt of 3:6-diamino-10-methyl-acridinium by causing 3:6-diamino-10-methyl-acridinium hydroxide or a salt derived therefrom to react with methane-sulphonic acid or a salt thereof whereby 3:6-diamino-10-methyl-acridinium methane sulphonate is formed.

The following examples illustrate how the invention may be carried out in practice, but it is to be understood that the invention is by no means limited to these examples:

*Example 1.*—In a distillation apparatus connected with a water pump a warm solution of the following composition is evaporated to dryness on the water bath:—

| | Grams |
|---|---|
| 3:6-diamino-10-methyl-acridinium chloride | 50 |
| Methane-sulphonic acid | 75 |
| Distilled water | 75 |

25 cc. of water are then added, and the product is taken down to dryness once more. It is then redissolved by the addition of 100 cc. of water, ammonia solution (22° Bé.) is added until neutrality to Congo red is obtained and the solution is then left to crystallize. The crystals are separated as completely as possible from the mother liquor without washing and are then dried in vacuo. The crude product thus obtained is dissolved in 250 cc. of boiling absolute methyl alcohol and 1 gram of decolorizing charcoal is added. The solution is filtered and allowed to crystallize, when beautiful orange prisms are obtained. These are filtered off, washed with methyl alcohol and dried in vacuo. A first crop of crystals is thus obtained, weighing 51 grams, and consisting of 3:6-diamino-10-methyl-acridinium methane-sulphonate free from chloride and sulphate.

By concentration of the mother liquors, a further quantity of crude product is obtained which, after purification, furnishes a second crop of 8.9 grams of the pure methane-sulphonate. The total amount obtained is therefore 59.9 grams, which gives a yield of 97.5% of the theoretical, calculated from the amount of 3:6-diamino-10- methyl-acridinium chloride taken at the beginning.

58.8 grams of ammonium methane-sulphonate are also recovered.

*Example 2.*—A solution of the following is first prepared by warming the constituents together:

|  | Grams |
|---|---|
| 3:6-diamino-10-methyl-acridinium chloride | 5 |
| Methane-sulphonic acid | 7.5 |
| Distilled water | 7.5 |

This solution is poured in thin layers on to a number of dishes and is evaporated to dryness in an oven at 100°–110° C. The drying takes about six hours. The product obtained is purified as in Example 1.

*Example 3.*—A warm solution of 55 grams of 3,6-diamino-10-methyl-acridinium chloride in 100 cc. of water is allowed to flow, with vigorous stirring, into a boiling solution of 20 grams of silver methane-sulphonate in 100 cc. of water. After cooling, the silver chloride formed is filtered off, and the filtrate is evaporated. This gives a crop of 60 grams of the new salt in a good crystalline form.

What I claim and desire to secure by Letters Patent is:—

As a new article of manufacture 3:6-diamino-10-methyl-acridinium methane sulphonate.

PAUL LOUIS GAILLIOT.